Patented Oct. 2, 1945

2,386,157

UNITED STATES PATENT OFFICE 2,386,157

METHOD FOR THE TREATMENT OF PHARMACEUTICALS

Charles L. Barthen, Manhasset, N. Y., Joel B. Peterson, Summit, N. J., and Leslie A. McClintock, Worcester, Mass., assignors to White Laboratories, Inc., Newark, N. J., a corporation of New Jersey No Drawing. Application March 4, 1943, Serial No. 478,169

12 Claims. (Cl. 21—58)

This invention relates to the treatment of pharmaceuticals and is particularly concerned with a method for the sterilization of pharmaceutical powders which process may constitute a phase of the packaging thereof.

The sterilization of pharmaceutical products is ordinarily accomplished by subjecting the unsterile material either to heat or to the action of ultra-violet light. While such procedures are satisfactory where a relatively stable material is concerned, they may be very deleterious to pharmaceuticals of organic or biological origin due to changes brought about in the chemical or physical nature of the product. Also the use of heat is undesirable with powdered materials because fusion of the particles into hard masses may necessitate a subsequent grinding operation with resultant inconvenience, possible recontamination, and expense.

Of particular interest at the present time is the problem of sterilizing the sulfa drugs. These compounds, altho specific against a wide variety of infection producing organisms, have little or no toxicity against Cl. tetani and other spore forming organisms, spores and fungi. As a consequence, the parenteral administration of the sulfa drugs or their introduction into open wounds by dusting frequently has been accompanied by undesirable results directly attributable to the contamination of the pharmaceutical with the organisms in question. The attendant complications have not only been of incalculable inconvenience to the medical profession, but have endangered seriously the well being and even the lives of the patients affected. This belated recognition of the short-comings of current practices in the use of sulfa drugs threatens materially to limit the scope of their application.

A recent development in the utilization of pharmaceuticals of the sulfa drug type has been the provision of the products in powdered form encased in flexible tube structures. Such article may be perforated and the contents conveniently squeezed therefrom and into an open wound in the form of a fine dust or powder. This method of application has been found particularly of value for the treatment of gunshot wounds and lacerations and has potential value as an emergency treatment for safeguarding members of the armed forces against wound infection. This practice in packaging requires the introduction of an unsterile powder into contact with the inner surfaces of an unsterile tube and greatly complicates the problem of sterilization.

Present practice in the flexible tube packaging of the sulfa drugs in powder form involves the utilization of plastic containers. In order to insure an aseptic product and to minimize the possibility of recontamination, it is desirable that the sealed tube and contents be sterilized as a unit. The application of heat to accomplish this result is not practical because of the tendency of the particles of sulfa drugs to fuse together and the susceptibility of the plastic employed in the container to undergo deformation at moderately elevated temperatures. Similarly ultra-violet light is not satisfactory as means for sterilization because of the difficulty of making contact with the bacteria contaminated pharmaceutical and the inner surfaces of the container. The desirability of the development of improved methods of sterilization is apparent.

It is among the objects of the present invention to provide a novel method for the treatment of pharmaceuticals. A further object is to provide means for the sterilizing of powdered pharmaceuticals and particularly of such a product packaged in flexible plastic tubes. A still further object contemplates the provision of a sterilizing procedure constituting a phase of the operation of packaging powdered pharmaceuticals in flexible plastic tubes. A further object contemplates the provision of improved pharmaceutical compositions. Still other objects will become evident from the following specification.

According to the present invention a powdered pharmaceutical encased in a vapor-permeable plastic tube is treated with a solution of an antiseptic in a volatile organic solvent in which the pharmaceutical and plastic are but sparingly soluble and the solvent thereafter diffused thru the walls of the tube. While it might be expected that such operation would result in the cementing together of the particles of the pharmaceutical into a hard infrangible mass, we have discovered that the encased residues from the evaporation and diffusion of the solvent consist of a friable cake which on squeezing of the tube readily breaks up to yield the pharmaceutical as a dry powder, each particle of which is coated with antiseptic. This product is delivered as a fine dust upon perforating and squeezing the tube, and is sterile. Operation in this manner precludes the possibility of contamination of the pharmaceutical with organisms and their spores as might result from the sterilizing of the pharmaceutical and subsequent packaging, and insures the aseptic nature of the product on delivery from the tube.

In operating in accordance with the present invention, the powdered pharmaceutical may first be charged into the tube, thereafter wet with the solution of antiseptic, and the tube then sealed. An alternate procedure contemplates the introduction of the antiseptic solution by injection thru the wall of the tube following the sealing operation. A still further mode of operation includes the introduction into the tube of a dispersion of the powdered pharmaceutical in the antiseptic solution. Such dispersion may be in the form of a fluid suspension, of a paste, or otherwise as may be convenient. In any event the powdered pharmaceutical wet with the antiseptic solution is caused to be present in the sealed tube, and the solvent thereafter dissipated by diffusion thru the walls of the tube, as by evaporation. The diffusion step may be accomplished by introducing the tube and contents into a zone of reduced pressure whereby evaporation of the solvent thru the walls of the tube is rapidly accomplished. The diffusion may also be carried out, but at a slower rate, by permitting the tube to stand for a period of time at atmospheric pressure. Regardless of the exact method of operation, the diffusion of the solvent may be accelerated by gently warming the tube and contents. Care must be exercised, however, that the temperature employed not approach too closely the fusion temperature of either the pharmaceutical or plastic, or materially increase the solubility of the pharmaceutical or plastic in the solvent employed as carrier for the antiseptic. The rate of diffusion may also be increased by agitating the tube and contents.

While the present invention is applicable to the sterilizing and packaging of pharmaceuticals generally, a preferred embodiment resides in the herein described process as applied to the "sulfa drugs," e. g. sulfanilamide, sulfathiazole, sulfapyridine, sulfadiazine, sulfaguanidine, sulfamethylthiazol, etc. Other pharmaceuticals of organic or biological origin which are further illustrative of the scope of the invention include all surgical dusting powders, estrogenic hormone, cortical hormone, etc.

Any suitable antiseptic may be employed provided only that it not react with the pharmaceutical, markedly change the desired physical properties of the pharmaceutical, inactivate the particular pharmaceutical employed, or be deleterious to the health and well being of humans in the amounts required to accomplish the sterilizing of the pharmaceutical. Representative of the antiseptics found suitable, particularly in the sterilization of the sulfa drugs, are tetrabromoortho-cresol, 2-chloro-4-phenyl-phenol, and tyrothricin (a precursor of gramicidin). Other antiseptics which may be similarly employed in accordance with the teaching of the invention include 2-phenyl-phenol, 4-cyclohexyl-phenol, 4-chloro-3.5-dimethyl-phenol, 4-tertiary-hexyl-6-bromo - phenol, 4-chloro-6-normaloctyl - phenol, hexyl-resorcinol, salts of the foregoing, quaternary amonium halides, antiseptic dyes, etc. The amounts of the antiseptic employed are not critical and may vary from as little as 0.001 per cent to 60 per cent or more by weight of the pharmaceutical under treatment. The exact amount employed is dependent upon the comparative efficiency of the antiseptic selected, its compatibility with the pharmaceutical, its physical state, and the tolerance of living tissue and the body therefore.

The volatile organic liquid employed as the carrier for the antiseptic may be any solvent in which the pharmaceutical and plastic are sparingly soluble. The expression "sparingly soluble" refers in general to solubilities under 1 per cent by weight. Somewhat higher solubilities may be tolerated where not objectionable from the viewpoint of causing caking of the pharmaceutical residue and/or impairment of the flexible tube. Representative solvents which may be employed with various combinations of pharmaceutical, plastic and antiseptic include benzene, toluene, xylene, ethyl ether, ethyl alcohol, acetone, ethylene chloride, chloroform, carbon tetrachloride, hexane, cyclohexene, low boiling petroleum distillates, etc. If desired mixtures of such solvents may be employed where it is desired to obtain a carrier of modified solvent properties and/or volatility. The concentration of antiseptic in the solvent is a matter of choice.

The expression "vapor-permeable plastic" as herein employed refers to plastics and cellulosic fibers which in the form of sheet or foil as encountered in the walls of a flexible tube are sufficiently permeable as to permit the diffusion of vapors of volatile organic solvents while at the same time being sufficiently impermeable as not to permit the ready passage thru of the solvent in liquid state or solutions of the antiseptic therein. Plastics which have been found to have this property with respect to the benzene hydrocarbons include the cellulose esters and ethers such as cellulose acetate, cellulose nitrate, and ethyl cellulose. Regenerated cellulose is also satisfactory. Other plastic materials which may be similarly employed include amorphous polymers such as those of vinyl chloride and the acrylates. Paper and cloth impregnated or coated with such materials may also be used and in some instances, paper alone is satisfactory and is included within the scope of the above-quoted term as employed in the appended claims.

The invention is illustrated by the following examples which are not to be construed as limiting.

Example 1

10 parts by weight of unsterile sulfanilamide powder was charged into an unsterile cellulose acetate flexible tube. 0.012 part by weight of tetrabromo-ortho-cresol dissolved in benzene was then delivered into the open end of the tube and the tube sealed. Care was taken that the interior walls of the tube and the sulfanilamide powder were thoroughly wet with the benzene solution. The tube was allowed to stand at room temperature and at atmospheric pressure. Within approximately 15 minutes the walls of the tube became very pliable and benzene vapor began to diffuse therethru. Several hours were required for the complete diffusion of the benzene, but at the end of this time the walls of the tube regained their original plasticity characteristics. Upon investigation it was found that the residue from the benzene diffusion was in the form of a friable cake and readily broken up into a fine powder simply by squeezing and working the tube. When the tube was perforated and shaken, the sulfanilamide was delivered therefrom as a fine dust product. This dust consisted of small particles of sulfanilamide coated with tetrabromo-ortho-cresol, and was sterile on delivery. The product was employed in clinical determinations in vivo and vitro for the control of various infectious organisms. No disadvantageous physiological reaction was observed attributable to the presence of the tetrabromo-ortho-cresol.

Example 2

In a similar manner unsterile sulfathiazole powder was subjected to treatment with a toluene solution of 2-chloro-4-phenyl-phenol in a flexible tube of nitrocellulose. The amounts of sulfa drug, solvent, and antiseptic were identical with those set forth in Example 1. The time required for the complete diffusion of the toluene was somewhat greater than when benzene was employed, otherwise an exactly analogous result was obtained both with respect to the physical and pharmaceutical properties of the ultimate product and its sterility and ease of manipulation.

Example 3

Likewise 10 parts by weight of unsterile sulfanilamide and a solution in benzene of tyrothricin may be introduced into a flexible tube of cellulose acetate. When this tube is closed and thereafter introduced into a zone of reduced pressure in the order of ½ to ⅓ atmosphere, a much more rapid diffusion of benzene thru the tube walls may be obtained than reported in the preceding examples. The residue of sulfanilamide particles coated with tyrothricin will be found similar as regards sterility and dusting properties with the products previously reported.

While the foregoing examples and discussion have been directed particularly to the treatment of a single pharmaceutical material with a solution of a single antiseptic, it is to be understood that mixtures of two or more pharmaceuticals and solutions of mixtures of antiseptic materials may similarly be employed. Also, the pharmaceutical may be modified with various solid diluents such as diatomaceous earth, talc, bentonite, alginates, etc., prior to treatment. Similarly the antiseptic solution employed may contain solvent miscible wetting agents and the like to facilitate and insure intimate contact with and wetting of the pharmaceutical particles and interior walls of the tube by the solution, or to modify the properties of the ultimate pharmaceutical product.

The foregoing discussion and description have considered methods for the treatment of pharmaceuticals. A further element of the present invention resides in compositions comprising the sulfa drugs and antiseptic materials. In this connection it has been found that certain phenols and other bactericidal substances such as tyrothricin act synergistically with sulfa drugs to control the growth and development of bacterial organisms at concentrations far below those required for the components of such mixtures. Also the presence of urea in mixtures of the sulfa drugs and antiseptics was found to be desirable. In such mixture, urea serves as a solvent for the sulfa drug and also accomplishes a sparing action on the drug by reason of inhibiting its chemical conjugation with albumin and degradation products thereof, prevents its inactivation by para-amino-benzoic acid, and increases the bacteristatic effectiveness of the drug. These observations were the result of numerous determinations both in vitro and vivo with the compositions indicated.

Against staphylococcus aureus, the lowest concentration of 2-chloro-4-phenyl-phenol which would completely inhibit growth for 24 hours at 37° C. was 0.96 mgm. per cent. This was also the lowest concentration that was bactericidal. As much as 125 mgm. per cent of sulfanilamide produced less than 10 per cent inhibition of growth in 24 hours. Upon the addition of 0.12 mgm. per cent of the phenol to the sulfanilamide, a composition was obtained giving an 80 per cent inhibition. The addition of 0.24 mgm. per cent of the phenol resulted in 100 per cent inhibition.

Similar determinations with tetrabromo-ortho-cresol showed that a concentration of 0.30 mgm. per cent was required to completely inhibit growth of the staphylococcus organism. In the presence of 125 mgm. per cent of sulfanilamide, as little as 5 micrograms per cent (0.005 mgm. per 100 milliliters) of the tetra-bromo-ortho-cresol gave more than 75 per cent inhibition. 0.15 mgm. per cent of the cresol compound in the composition gave complete inhibition. Detailed animal studies revealed no evidence of undesirable toxicity from mixtures of the tetra-bromo-ortho-cresol and sulfanilamide, or from such mixture when modified with urea.

Tyrothricin was substituted for the phenolic bactericides in the foregoing mixtures and found to act in a similar fashion but at much lower concentrations. A marked effect was obtained with 125 mgms. per cent of sulfanilamide and as little as 1 microgram per cent of tyrothricin. When tyrothricin was employed alone, as much as 50 micrograms per cent failed to accomplish any inhibition.

A further embodiment of the invention contemplates the use of a volatile organic preservative. This bactericide would necessarily be one in which the pharmaceutical and plastic are but sparingly soluble. Such preservative can be diffused thru the wall of the tube and away from the pharmaceutical and yet leave the pharmaceutical in sterile form by reason of the period of contact preceding the diffusion. This operation has the advantage of leaving a friable residue of sterile pharmaceutical unmodified as regards chemical and/or physiological properties.

Further applications for which the new and improved method of sterilization is adapted are in the treatment of surgical dressings, sutures, and crystalline hormone materials such as estrogenic and cortical hormone. The dressings and sutures may be sealed along with the preservative solution in a suitable plastic container such as a tube, envelope, etc. Upon diffusion of the solvent, the dressing or other article is left in the container in sterile condition and protected against recontamination. Crystals of the hormones, as set forth above, ranging from minute particles up to the size of a pea are customarily administered in the treatment of Addison's disease by being implanted under the skin and gradually dissolved away over a period of months. Such crystals may conveniently be sterilized by enclosure along with a solution of preservative in a vapor-permeable plastic container substantially as hereinbefore described for powdered pharmaceuticals.

We claim:

1. A method for the treatment of pharmaceuticals including the steps of sealing the pharmaceutical in powdered form into a vapor-permeable plastic tube with a solution of an antiseptic in a volatile organic solvent in which the pharmaceutical and plastic are but sparingly soluble, and diffusing the solvent thru the walls of the tube.

2. A method for sterilizing powdered pharmaceuticals encased in a vapor-permeable plastic tube which includes the steps of wetting the contents of the tube with a solution of an antiseptic in a volatile organic liquid in which the pharmaceutical and plastic are but sparingly soluble, and evaporating the solvent thru the walls of the tube to leave therein a friable cake of pharmaceutical particles coated with antiseptic.

3. A method for packaging powdered pharmaceuticals which includes the steps of introducing the pharmaceutical into a vapor-permeable plastic tube, wetting the contents of the tube with a solution of an antiseptic in a volatile organic liquid in which the pharmaceutical and plastic are but sparingly soluble, sealing the tube, and diffusing the solvent thru the walls of the tube.

4. A method for the treatment of pharmaceuticals including the steps of sealing the pharmaceutical in powdered form into a vapor-permeable plastic tube with a solution of an antiseptic in a volatile organic solvent in which the pharmaceutical and plastic are but sparingly soluble, and introducing the tube and contents into a zone of reduced pressure.

5. A method for the treatment of sulfa drugs including the steps of sealing the sulfa drug in powdered form into a vapor-permeable plastic tube with a solution of an antiseptic in a volatile organic solvent in which the sulfa drug and plastic are but sparingly soluble, and diffusing the solvent thru the walls of the tube.

6. A method for the treatment of sulfa drugs including the steps of sealing the sulfa drug in powdered form into a vapor-permeable plastic tube with a solution of a phenolic antiseptic in a volatile organic solvent in which the sulfa drug and plastic are but sparingly soluble, and diffusing the solvent thru the walls of the tube.

7. A method for the treatment of sulfa drugs including the steps of sealing the sulfa drug in powdered form into a vapor-permeable plastic tube with a solution of a halo-phenolic antiseptic in a volatile organic solvent in which the sulfa drug and plastic are but sparingly soluble, and diffusing the solvent thru the walls of the tube.

8. A method for sterilizing powdered sulfa drugs encased in a vapor-permeable plastic tube which includes the steps of wetting the contents of the tube with a solution of an antiseptic in a volatile organic liquid in which the sulfa drug and plastic are but sparingly soluble, and evaporating the solvent thru the walls of the tube to leave therein a friable cake of sulfa drug particles coated with antiseptic.

9. A method for packaging powdered sulfa drugs which includes the steps of introducing the powdered drug into a vapor-permeable plastic tube, wetting the contents of the tube with a solution of an antiseptic in a volatile organic liquid in which the sulfa drug and plastic are but sparingly soluble, sealing the tube, and diffusing the solvent thru the walls of the tube.

10. A method for sterilizing powdered sulfa drugs encased in a vapor-permeable plastic tube which includes the steps of wetting the contents of the tube with a solution of a phenolic antiseptic in a volatile organic liquid in which the sulfa drug and plastic are but sparingly soluble, and evaporating the solvent thru the walls of the tube to leave therein a friable cake of sulfa drug particles coated with phenolic antiseptic.

11. A method for sterilizing surgical dressings and sutures including the steps of sealing the unsterile article into a vapor-permeable container with a solution of an antiseptic in a volatile organic solvent, and diffusing the solvent thru the walls of the container.

12. A method for sterilizing including the steps of sealing unsterile material into a vapor-permeable container with a solution of an antiseptic in a volatile organic solvent, and diffusing the solvent thru the walls of the container.

LESLIE A. McCLINTOCK.
JOEL B. PETERSON.
CHARLES L. BARTHEN.